United States Patent
Gomes et al.

(10) Patent No.: US 11,466,561 B2
(45) Date of Patent: Oct. 11, 2022

(54) SYSTEMS AND METHODS FOR MEASURING THE POSITIONS OF FLUIDS IN A WELL

(71) Applicant: BP Corporation North America Inc., Houston, TX (US)

(72) Inventors: Paulo Jorge Da Cunha Gomes, Sunbury on Thames (GB); Mark James, Houston, TX (US); Emannuel Claude Therond, Sunbury on Thames (GB); James Joseph David Vincent, Sunbury on Thames (GB)

(73) Assignee: BP Corporation North America Inc., Houston, TX (US)

( * ) Notice: Subject to any disclaimer, the term of this patent is extended or adjusted under 35 U.S.C. 154(b) by 190 days.

(21) Appl. No.: 16/650,539

(22) PCT Filed: Sep. 27, 2018

(86) PCT No.: PCT/US2018/053175
§ 371 (c)(1),
(2) Date: Mar. 25, 2020

(87) PCT Pub. No.: WO2019/067754
PCT Pub. Date: Apr. 4, 2019

(65) Prior Publication Data
US 2020/0232315 A1     Jul. 23, 2020

(51) Int. Cl.
*E21B 47/047*     (2012.01)
*E21B 33/14*     (2006.01)
(Continued)

(52) U.S. Cl.
CPC ............ *E21B 47/047* (2020.05); *E21B 33/14* (2013.01); *E21B 47/06* (2013.01); *G01F 9/00* (2013.01); *G05B 17/00* (2013.01)

(58) Field of Classification Search
CPC .................................................... E21B 47/047
See application file for complete search history.

(56) References Cited

FOREIGN PATENT DOCUMENTS

| EP | 2594731 A2 | 5/2013 |
| WO | 91/03620 A1 | 3/1991 |
| WO | 2016/032679 A1 | 3/2016 |

OTHER PUBLICATIONS

Emmanuel Therond et al: "Systematic Use of Real Time Data Analysis for Primary Cementing and Cement Job Verification", SPE, May 4, 2017 (May 4, 2017), XP055545358, DOI: 10.4043/27557-MS; ISBN: 978-1-61399-512-9; abstract; figures 1-6, p. 8, paragraph 1, Lift Pressure Topk of Fluids, Log displays (last sentence); p. 7, p. 10, lines 8-10.

(Continued)

*Primary Examiner* — Robert E Fuller
(74) *Attorney, Agent, or Firm* — Conley Rose, P.C.

(57) ABSTRACT

A method for cementing a borehole includes pumping a collection of fluids into the borehole through a tubular string in the borehole and flowing the collection of fluids up an annulus positioned between the tubular string and a sidewall of the borehole. The method additionally includes monitoring a volume of the fluids pumped into the borehole, and performing a first estimation of a position of the fluids based on the volume of the collection of fluids pumped into the borehole, and an initial estimate of an average diameter of the sidewall of at least a portion of the borehole. The method further includes calculating a corrected estimate of the average diameter based on the first estimation and a pressure of the fluids measured at an inlet of the tubular string, and performing a second estimation of the position of the fluids based on the corrected estimate of the average diameter.

10 Claims, 5 Drawing Sheets

(51) Int. Cl.
*E21B 47/06* (2012.01)
*G01F 9/00* (2006.01)
*G05B 17/00* (2006.01)

(56) References Cited

OTHER PUBLICATIONS

R. Israel et al: "Well Advisor—Integrating Real-time Data With Predictive Tools, Processes and Expertise to Enable More Informed Operational Decisions", 2015 SPE/IADC Drilling Conference and Exhibition, Mar. 19, 2015, (Mar. 19, 2015), XP055545564, London. ISSN: 1551-6245, abstract; figure 7; Cementing; p. 12-13, paragraph.

International Search Report dated Mar. 27, 2019 for International Application No. PCT/US2018/053175.

SYSTEMS AND METHODS FOR MEASURING THE POSITIONS OF FLUIDS IN A WELL

CROSS-REFERENCE TO RELATED APPLICATIONS

This application is a 35 U.S.C. § 371 national stage application of PCT/US2018/053175 filed Sep. 27, 2018, and entitled "Systems and Methods for Measuring the Positions of Fluids in a Well," which claims benefit of U.S. provisional patent application Serial No. 62/565,359 filed Sep. 29, 2017, and entitled "Systems and Methods for Measuring the Positions of Fluids in a Well," both of which are hereby incorporated herein by reference in their entirety for all purposes.

STATEMENT REGARDING FEDERALLY SPONSORED RESEARCH OR DEVELOPMENT

Not applicable.

BACKGROUND

During drilling of a borehole in a terranean formation and subsequent completion operations, a tubular casing string ("casing") or liner is typically deployed in the borehole. Cement is pumped into the annulus formed between a sidewall of the borehole and the casing to secure the casing in position and restrict fluid communication between at least a portion of the borehole and the surrounding formation. In some operations, only a portion of the borehole is cemented at a time. As a result, location of the top of cement (TOC) of the portion is disposed beneath the surface. Following the cementing operation the position of the TOC may be evaluated to determine whether the downhole zone was completely and successfully cemented. For instance, if the evaluation determines that the TOC is beneath (further downhole) from the targeted TOC for the downhole zone, then the section of casing spanning the downhole zone may lack isolation from the formation, potentially requiring remedial or corrective action to address potential leakage between the casing and the downhole zone.

SUMMARY

An embodiment of a method for cementing a terranean borehole comprises pumping a collection of fluids into the borehole through a passage of a tubular string extending into the borehole, flowing the collection of fluids up an annulus positioned between the tubular string and a sidewall of the borehole, monitoring a volume of the collection of fluids pumped into the borehole, performing a first estimation of a position of the collection of fluids in the borehole based on the volume of the collection of fluids pumped into the borehole, and an initial estimate of an average diameter of the sidewall of at least a portion of the borehole, calculating a corrected estimate of the average diameter based on the first estimation and a pressure of the collection of fluids measured at an inlet of the passage of the tubular string, and performing a second estimation of the position of the collection of fluids in the borehole based on the volume of the collection of fluids pumped into the borehole and the corrected estimate of the average diameter. In some embodiments, the collection of fluids comprises drilling mud and a cement slurry. In some embodiments, the method further comprises pumping a cement slurry through perforations formed in the casing or into the annulus from a surface of the borehole in response to the second estimation of the position of the collection of fluids. In certain embodiments, the pressure of the collection of fluids is measured at a first time, and performing the first estimation comprises comparing the pressure of the collection of fluids measured at the first time with a pressure of the collection of fluids measured at a second time, wherein the second time is after the first time. In certain embodiments, the method further comprises performing a third estimation of the position of the collection of fluids in the borehole by comparing the pressure of the collection of fluids measured at the second time with a pressure of the collection of fluids measured at a third time, wherein the third time is after the second time. In some embodiments, the second estimation of the position of the collection of fluids is performed after a predetermined period of time lapses following the first estimation of the position of the collection of fluids, and the third estimation of the position of the collection of fluids is performed after the predetermined period of time lapses following the second estimation of the position of the collection of fluids. In some embodiments, the method further comprises determining a pressure differential by subtracting the pressure of the collection of fluids measured at the second time from the pressure of the collection of fluids measured at the first time. In certain embodiments, the method further comprises estimating a hydrostatic pressure of a column of the collection of fluids disposed in the annulus at the first time, estimating a hydrostatic pressure of a column of the collection of fluids disposed in the annulus at the second time, estimating a hydrostatic pressure of a column of the collection of fluids disposed in the passage of the tubular string at the first time, estimating a hydrostatic pressure of a column of the collection of fluids disposed in the passage of the tubular string at the second time, estimating a frictional pressure drop of the collection of fluids flowing through the annulus at the first time, estimating a frictional pressure drop of the collection of fluids flowing through the annulus at the second time, estimating a frictional pressure drop of the collection of fluids flowing through the passage of the tubular string at the first time, and estimating a frictional pressure drop of the collection of fluids flowing through the passage of the tubular string at the second time. In certain embodiments, the method further comprises determining the corrected estimate of the average diameter by comparing the pressure differential with the estimated hydrostatic pressures and frictional pressure drops at the second time with the estimated hydrostatic pressures and frictional pressure drops at the first time. In some embodiments, the method further comprises increasing the size of the initial estimate of the average diameter in response to the pressure differential being less than the difference between the estimated hydrostatic pressures and frictional pressure drops at the second time and the estimated hydrostatic pressures and frictional pressure drops at the first time. In some embodiments, the method further comprises decreasing the size of the initial estimate of the average diameter in response to the pressure differential being greater than the difference between the estimated hydrostatic pressures and frictional pressure drops at the second time and the estimated hydrostatic pressures and frictional pressure drops at the first time. In certain embodiments, the method further comprises using a rheology model of the collection of fluids to estimate the frictional pressure drop of the collection of fluids in the annulus and the passage of the tubular string at the first time, and using a rheology model of the collection of fluids to estimate the frictional pressure drop of the collection of fluids in the annulus and the passage of the tubular string at the second time. In certain embodiments, the rheology model of the collection of fluids and the rheology model of the collection of fluids comprise at least one of a Herschel-Bulkley model and a Bingham plastic model.

An embodiment of a method for cementing a terranean borehole comprises pumping a collection of fluids into the borehole through a passage of a tubular string extending into the borehole, flowing the collection of fluids up an annulus between the tubular string and a sidewall of the borehole, comparing a pressure of the collection fluids measured at an inlet of the passage of the tubular string at a first time with a pressure of the collection of fluids measured at the inlet of the passage of the tubular string at a second time, wherein the second time is after the first time, and estimating a position of the collection of fluids in the borehole based on the comparison of the pressures of the collection of fluids measured at the first and second times. In some embodiments, the method further comprises pumping a cement slurry through perforations formed in the casing or into the annulus from a surface of the borehole in response to the estimated position of the collection of fluids. In some embodiments, the collection of fluids comprises a drilling mud and a cement slurry. In certain embodiments, the first time occurs prior to the pumping of cement slurry into the borehole, and the second time occurs within ten seconds of a first plug disposed in the passage of the tubular string contacting a second plug disposed in the passage of the tubular string. In certain embodiments, the method further comprises calculating a first pressure balance between the inlet of the passage of the tubular string and an outlet of the annulus at the first time, and calculating a second pressure balance between the inlet of the passage of the tubular string and an outlet of the annulus at the second time. In some embodiments, the method further comprises estimating a hydrostatic pressure of a column of the collection of fluids disposed in the annulus at the first time, estimating a hydrostatic pressure of a column of the collection of fluids disposed in the annulus at the second time, estimating a hydrostatic pressure of a column of the collection of fluids disposed in the passage of the tubular string at the first time, estimating a hydrostatic pressure of a column of the collection of fluids disposed in the passage of the tubular string at the second time, estimating a frictional pressure drop of the collection of fluids flowing through the annulus at the first time, estimating a frictional pressure drop of the collection of fluids flowing through the annulus at the second time, estimating a frictional pressure drop of the collection of fluids flowing through the passage of the tubular string at the first time, and estimating a frictional pressure drop of the collection of fluids flowing through the passage of the tubular string at the second time. In some embodiments, the method further comprises determining a first pressure differential by subtracting the first pressure balance from the second pressure balance, determining a second pressure differential by subtracting the estimated hydrostatic pressures of the collection of fluids in the annulus at the second time, the hydrostatic pressure of the collection of fluids in the annulus at the first time, the hydrostatic pressures of the collection of fluids in the passage of the tubular string at the second time, the frictional pressure drop of the collection of fluids in the annulus at the first time, and the frictional pressure drop of the collection of fluids in the passage of the tubular string at the first time from a sum comprising the hydrostatic pressures of the collection of fluids in the annulus at the second time, the hydrostatic pressure of the collection of fluids in the passage of the tubular string at the first time, the frictional pressure drop of the collection of fluids in the annulus at the second time, and the frictional pressure drop of the collection of fluids in the passage of the tubular string at the second time, and comparing the first pressure differential with the second pressure differential.

An embodiment of a method for cementing a terranean borehole comprises pumping a collection of fluids into the borehole through a passage of a tubular string extending into the borehole, flowing the collection of fluids up an annulus positioned between the tubular string and a sidewall of the borehole, comparing a pressure of the collection of fluids measured at an inlet of the passage of the tubular string at a first time with a second pressure of the collection of fluids measured at the inlet of the passage of the tubular string at a second time, wherein the second time follows the first time, and correcting a cementing simulation based on the comparison between the first and second pressures. In some embodiments, the collection of fluids comprises drilling mud and a cement slurry. In some embodiments, the cementing simulation comprises an estimation of a position of the collection of fluids or the collection of fluids in the borehole based on an initial estimated average diameter of the sidewall of at least a portion of the borehole, and a measured volume of the collection of fluids pumped into the borehole. In certain embodiments, the method further comprises determining a corrected average diameter based on the comparison between the pressure of the collection of fluids measured at the first time and the pressure of the collection of fluids measured at the second time, and correcting the cementing simulation by substituting the initial estimated average diameter with the corrected average. In certain embodiments, the method further comprises estimating a hydrostatic pressure of a column of the collection of fluids disposed in the annulus at the first time, estimating a hydrostatic pressure of a column of the collection of fluids disposed in the annulus at the second time, estimating a hydrostatic pressure of a column of the collection of fluids disposed in the passage of the tubular string at the first time, estimating a hydrostatic pressure of a column of the collection of fluids disposed in the passage of the tubular string at the second time, estimating a frictional pressure drop of the collection of fluids flowing through the annulus at the first time, estimating a frictional pressure drop of the collection of fluids flowing through the annulus at the second time, estimating a frictional pressure drop of the collection of fluids flowing through the passage of the tubular string at the first time, estimating a frictional pressure drop of the collection of fluids flowing through the passage of the tubular string at the second time, estimating a hydrostatic pressure of a column of the collection of fluids disposed in the annulus at the second time, estimating a hydrostatic pressure of a column of the collection of fluids disposed in the passage of the tubular string at the second time, estimating a frictional pressure drop of the collection of fluids flowing through the annulus at the second time, and estimating a frictional pressure drop of the collection of fluids flowing through the passage of the tubular string at the second time. In some embodiments, the method further comprises pumping a cement slurry through perforations formed in the casing or into the annulus from a surface of the borehole in response to the corrected cementing simulation.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

Referring now to FIGS. 1-4, an embodiment of a completion or cementing system 10 for completing a borehole 20 that extends from the surface 2 into a terranean formation 4 is shown. Borehole 20 generally extends along a longitudinal axis 15. In the embodiment shown in FIGS. 1-4, completion system 10 generally includes a surface equipment or system 12 and a tubular or casing string ("casing") 30 extending within borehole 20.

In general, surface system 12 may include any suitable surface equipment known in the art for drilling, completing, and/or producing borehole 20 such as a derrick and related hardware, mud pumps, electrical/mechanical well control components, etc. In this embodiment, surface system 12 includes a cementing head 14 and a data processing system 18. Cementing head 14 supplies fluids and/or tools to a central passage 32 of casing 30 for performing a cementing operation within borehole 20. In addition, cementing head 14 includes a pressure sensor 16 for measuring the pressure of fluids flowing into passage 32 of casing 30 and a flow sensor 17 for measuring the volumetric flow rate of fluid entering passage 32 from cementing head 14. Data processing system 18 is in signal communication with the pressure and flow sensors 16, 17 of cementing head 14, and receives and records pressure and flow rate measurements from sensors 16, 17, respectively.

Borehole 20 extends from surface 2 to a terminal end 22 distal surface 2 and is defined by a generally cylindrical inner surface or sidewall 24 extending between surface 2 and terminal end 22. Sidewall 24 of borehole 20 has a diameter 24D that may vary along the axial length of borehole 20. An annulus 26 is formed radially between a cylindrical outer surface of casing 30 and the sidewall 22 of borehole 20, and extends axially from surface 2 to a lower end or shoe 34 of casing 30 located distal surface 2. In this embodiment, casing 30 comprises a shoulder or float collar 36 disposed proximal to shoe 34 that extends partially into passage 32 of casing 30.

In this embodiment, a downhole zone 28 of annulus 26 to be cemented by cementing system 10 extends from a lower end proximal to the terminal end 22 of borehole 20 and an upper end spaced from surface 2. The upper end of downhole zone 28 comprises a predetermined targeted position 29 at which cementing system 10 intends to position the top of cement (TOC) following the cementing operation performed on borehole 20 to thereby seal downhole zone 28 from formation 4.

Figure 1:
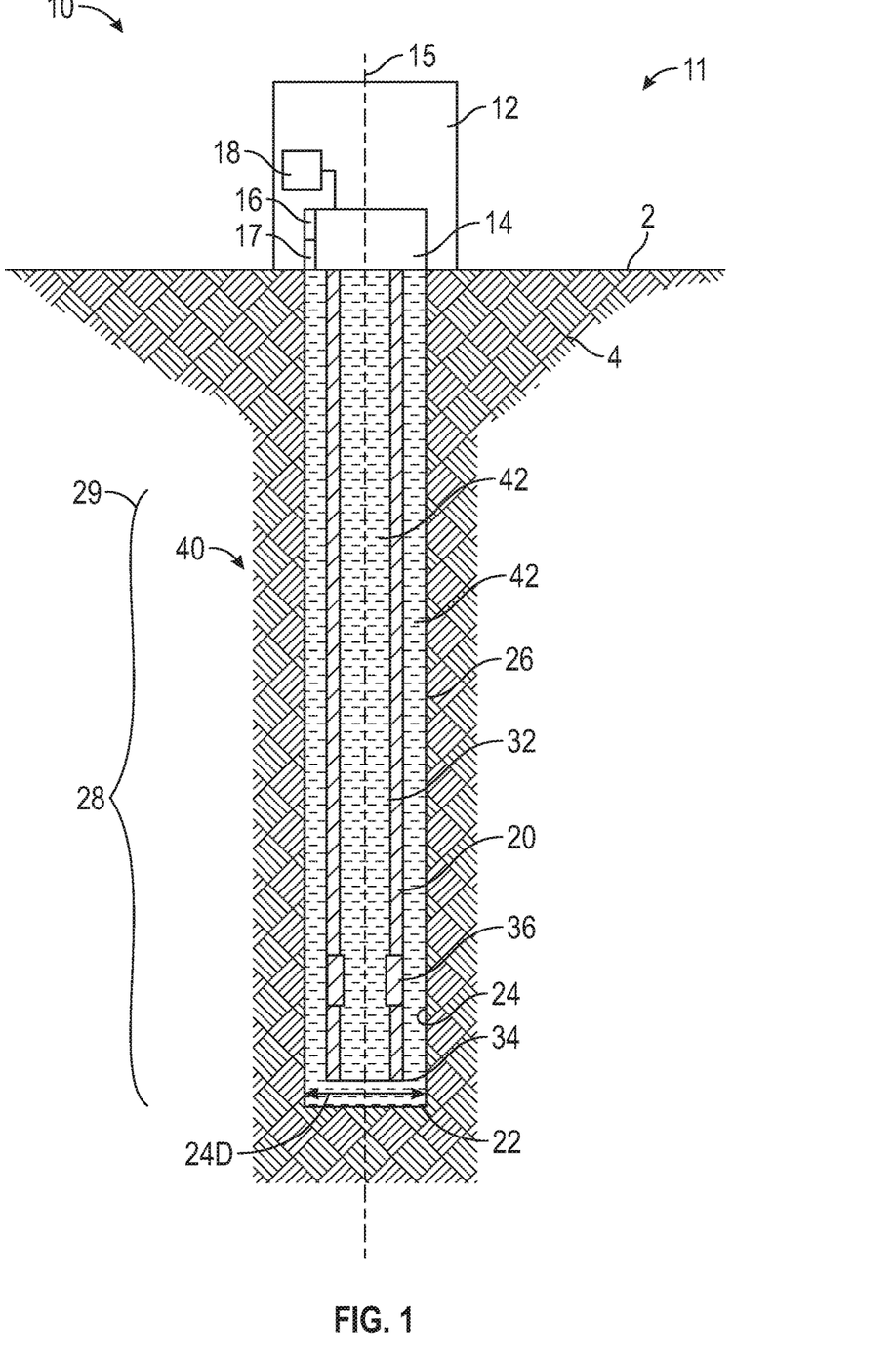
FIGS. 1-4 are schematic views of an embodiment of a system for cementing a well.

FIG. 1 illustrates cementing system 10 at a first stage 11 of a cementing operation performed on borehole 20. During the first stage 11 of the cementing operation performed by cementing system 10, a collection of fluids 40 is pumped into passage 32 of casing 30 from cementing head 14, and recirculated to the surface 2 through annulus 26. In this embodiment, the collection of fluids 40 circulated through borehole 20 during first stage 11 comprises a drilling fluid 42; however, in other embodiments, the collection of fluids 40 circulated during first stage 11 may comprise various fluids and/or combinations of fluids.

As the collection of fluids 40 is circulated through borehole 20 during the first stage 11, the pressure and flow sensors 16, 17 of cementing head 14 measure the pressure and volumetric flow rate, respectively, of the collection of fluids 40 as they enter passage 32 of casing 30 from cementing head 14. Additionally, the pressure and flow rate measurements provided by sensors 16, 17 are communicated to data processing system 18. In this manner, personnel of cementing system 10 monitors the pressure of the collection of fluids 40 entering passage 32 of casing 30 and the total amount or volume of the collection of fluids 40 pumped into passage 32 (via monitoring volumetric flow rate) during the first stage 11 of the cementing operation performed by cementing system 10. The drilling fluid 42 of the collection of fluids 40 circulates debris (e.g., drill cuttings, etc.) out of borehole 20 to the surface to prepare downhole zone 28 for cementing.

Figure 2:
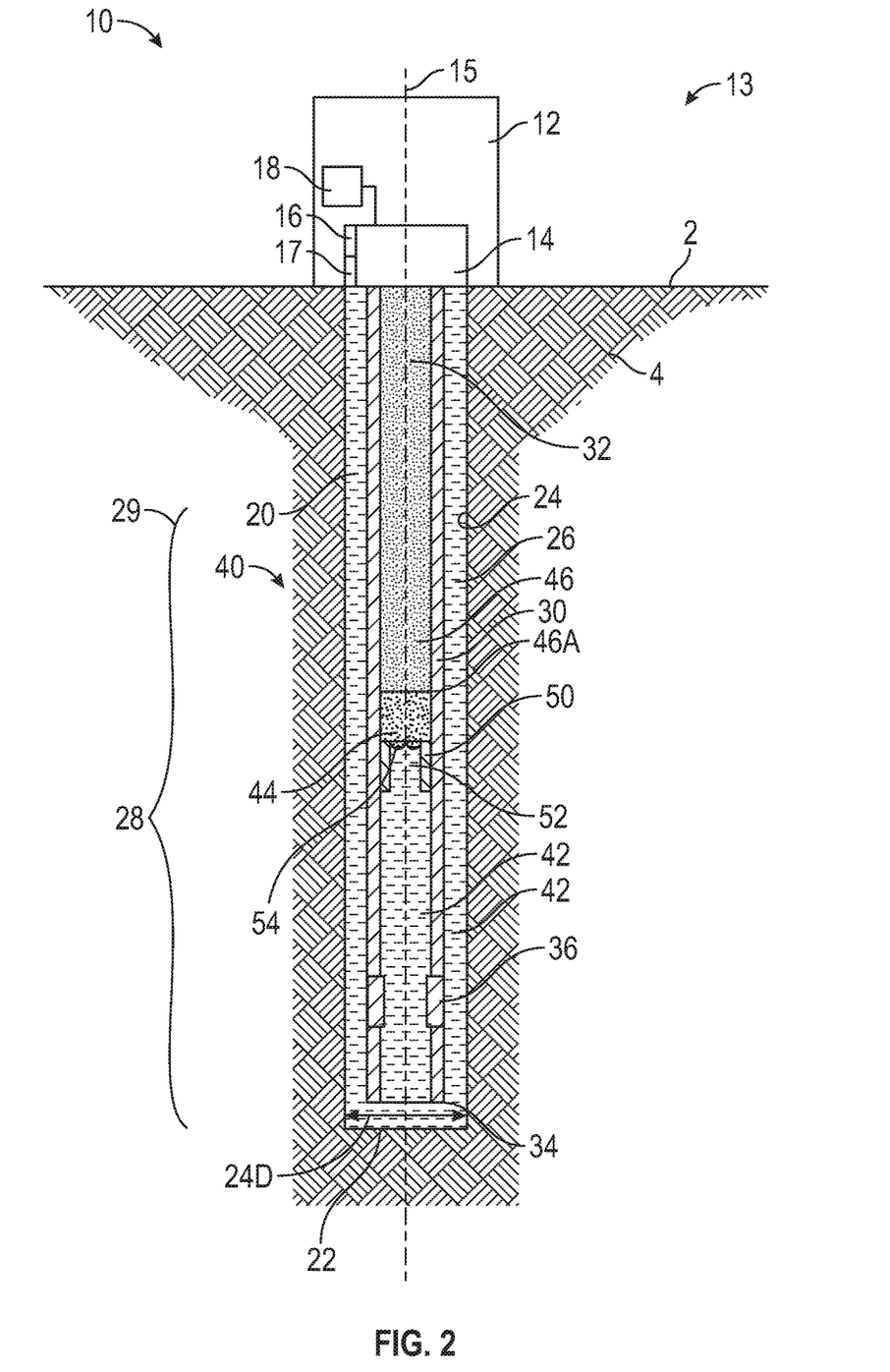

Referring now to FIG. 2, second stage 13 of the cementing operation performed by cementing system 10 after the circulation of drilling fluid 42 during the first stage 11 is shown. During the second stage 13 of the cementing operation, a wiper plug 50 is pumped from cementing head 14 into the passage 32 of casing 30, followed by a first volume of a spacer fluid 44 and a cement slurry 46. In this embodiment, the collection of fluids 40 comprises drilling fluid 42, spacer fluid 44, and cement slurry 46 during second stage 13 of the cementing operation. Spacer fluid 44 provides a fluid barrier spacing or separating a first or lead end 46A of the volume of cement slurry 46 from drilling fluid 42. In some embodiments, cement slurry 46 may comprise a plurality of cement slurries having varying fluid properties (e.g., density, etc.). Additionally, in other embodiments, the collection of fluids 40 employed in second stage 13 may not include first spacer fluid 44. In still other embodiments, the collection of fluids 40 employed in second stage 13 may include fluids in addition to drilling fluid 42, spacer fluid 44, and cement slurry 46.

Wiper plug 50 prepares casing 30 for the introduction of cement slurry 46 by wiping the inner surface of casing 30 as it is pushed through passage 32 towards float collar 36. In this embodiment, wiper plug 50 comprises a central bore or passage 52 that is sealed from spacer fluid 44 by a rupture disk 54. In this arrangement, pressure from spacer fluid 44 acts against wiper plug 50 and rupture disk 54 to force wiper plug 50 downwards through casing 30. Additionally, as wiper plug 50 is pumped through passage 32 of casing 30, drilling fluid 42 disposed in passage 32 is forced downwards towards casing shoe 34 while drilling fluid 42 disposed in annulus 26 is circulated upwards towards the surface 2. Pressure and flow sensors 16, 17 measure the pressure and volumetric flow rate of the collection of fluids 40 (e.g., spacer fluid 44 and cement slurry 46) as they enter passage 32 of casing 30 from cementing head 14, and communicate such measurements to data processing system 18 of surface system 12.

Figure 3:
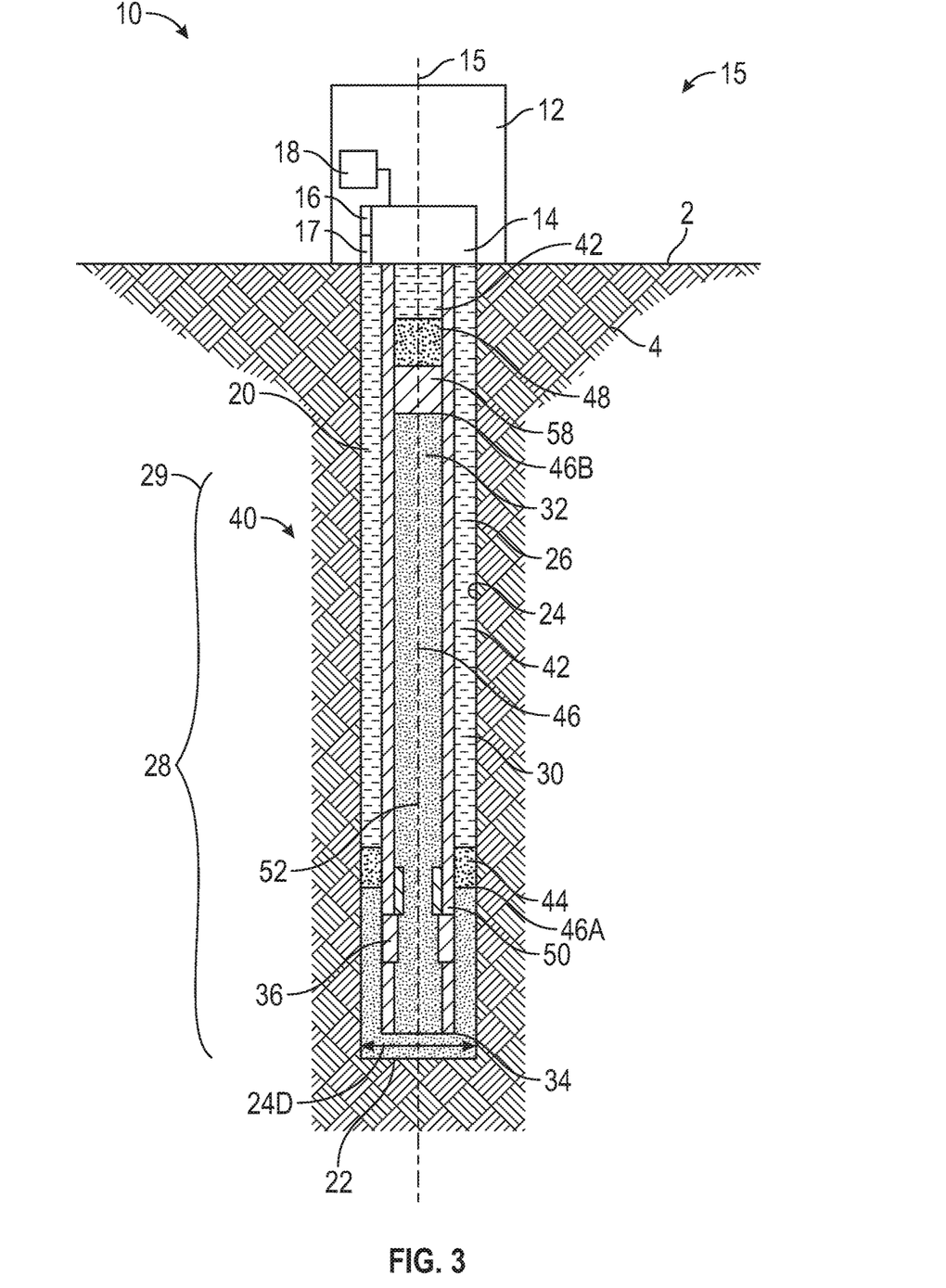

Moving now to FIG. 3, a third stage 15 of a cementing operation performed with cementing system 10 following the introduction of wiper plug 50, spacer fluid 44, and cement slurry 46 during the second stage 13 is shown. During the third stage 15 of the cementing operation, wiper plug 50 is pumped through passage 32 of casing 30 until wiper plug 50 lands against float collar 36, thereby restricting further downward travel of wiper plug 50 through casing 30. Once wiper plug 50 is seated against float collar 36, pressure builds against rupture disk 54 until rupture disk 54 is pierced or ruptured, allowing fluid disposed above wiper plug 50 (e.g., spacer fluid 44 and cement slurry 46) to flow through passage 52 of wiper plug 50 and into annulus 26.

Next, a second or shut-off plug 58 is pumped from cementing head 14 into the passage 32 of casing 30, followed by a second volume of spacer fluid 44 that separates a second or tail end 46B of the volume of cement slurry 46 from a second volume of drilling fluid 42 following the second volume of spacer fluid 44. In this embodiment, the collection of fluid 40 during the third stage 15 comprises drilling fluid 42, spacer fluid 44, and cement slurry 46; however, in other embodiments, the collection of fluids 40 circulated during third stage 15 may comprise various fluids and/or combinations of fluids. Unlike the wiper plug 50 landed against float collar 36, shut-off plug 58 does not include a central bore or passage, and is forced downwards through passage 32 of casing 30 by the pressure applied from spacer fluid 44. During third stage 15, the lead end 46A of cement slurry 46 is forced upwards towards surface 2 through annulus 26. Pressure and flow sensors 16, 17 measure the pressure and volumetric flow rate of the collection of fluids 40 (e.g., the second volume of spacer fluid 44 and the second volume of drilling fluid 42) as they enter passage 32 of casing 30 from cementing head 14, and communicate the measurements to data processing system 18 of surface system 12.

Figure 4:
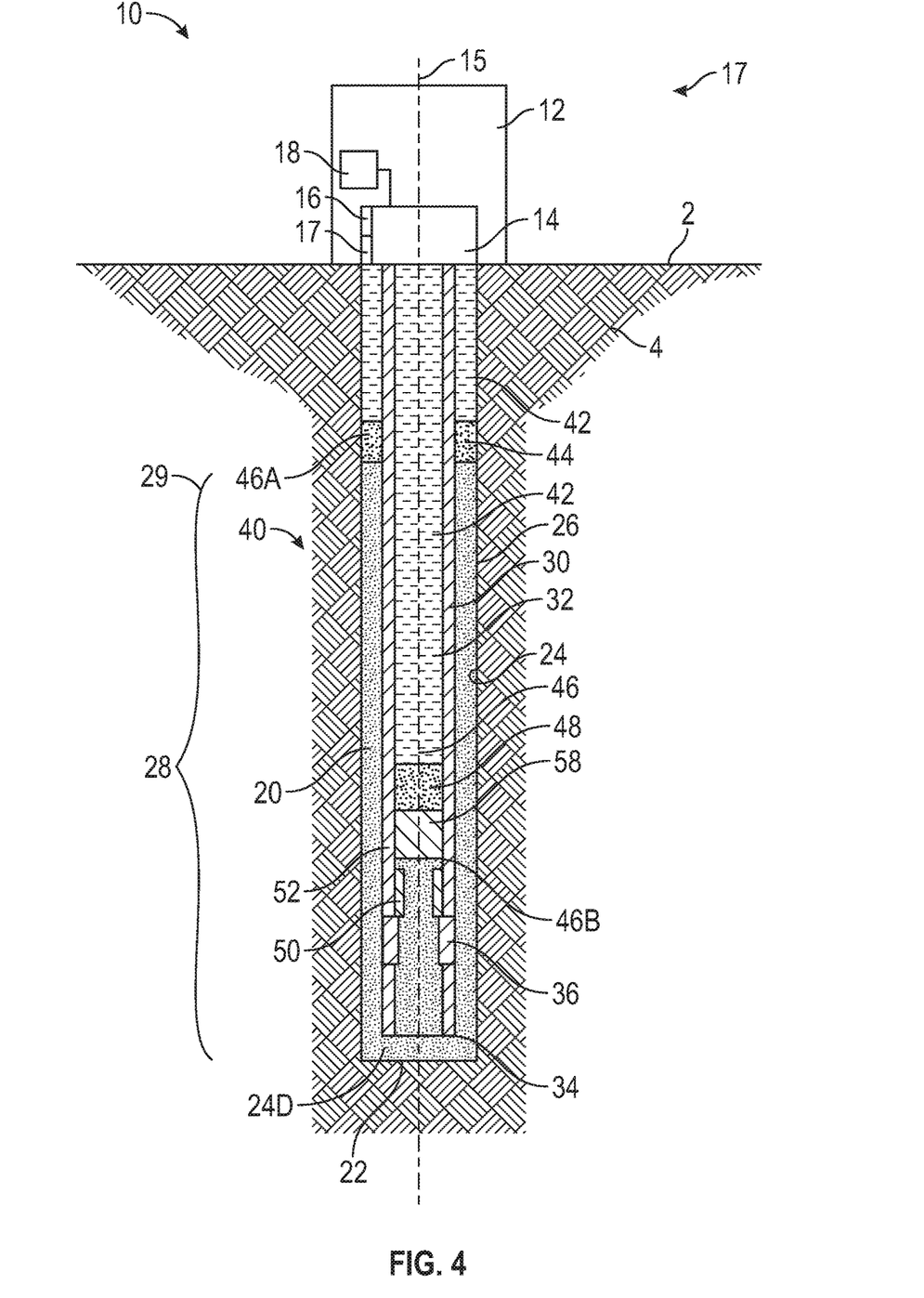

Referring now to FIG. 4, a fourth stage 17 of a cementing operation performed on borehole 20 with cementing system 10 following the introduction of shut-off plug 50, and the second volumes of spacer fluid 44 and cement slurry 46, respectively, during the third stage 15 is shown. During the fourth stage 17 of the cementing operation the second volume of drilling fluid 42 is pumped into passage 32 of casing 30 from cementing head 14 until shut-off plug 58 lands against wiper plug 50. Once shut-off plug 58 lands against or "bumps" wiper plug 50 shut-off pug 58 is prevented from travelling further through passage 32 of casing 30. Additionally, fluid in passage 32 of casing 30 is prevented from flowing across plugs 58, 50, and thus, pumping of drilling fluid 42 into passage 32 is ceased once shut-off plug 58 is landed against wiper plug 50 to prevent the over-pressurization of casing 30.

During the fourth stage 17 of the cementing operation, cementing system 10 locates the lead end 46A of cement slurry 46 to assess whether lead end 46A is at an axial position (relative central axis 15) at or proximal the targeted position 29 at the upper end of downhole zone 28. In particular, if the lead end 46A of cement slurry 46 is axially located at the targeted position 29, then cement slurry is positioned to sufficiently seal downhole zone 28 from borehole 20. However, if the lead end 46A of cement slurry 46 is spaced below targeted position 29, then fluid communication between borehole 20 and a portion of downhole zone 28 may remain, potentially requiring remedial or corrective action to properly isolate downhole zone 28 from borehole 20. Given that targeted position 29 is located beneath the surface 2, the position of lead end 46A of cement slurry 46 may not be quickly or conveniently measured. For example, the position of lead end 46A may be measured through the lengthy process of deploying a sonic tool into passage 32 of casing 30 to detect the position of cement slurry 46 via sonic resonance (e.g., for completing a cement bond log). In addition, although the position of the lead end 46 of cement slurry 46 may be estimated from the total volume the collection of fluids 40 pumped into borehole 20 following the introduction of cement slurry 46 into borehole 20 and an initial estimation of the average diameter 24D of borehole 20, the initial estimate of the average diameter 24D may depart from the actual average diameter 24D of borehole 20, potentially introducing errors into the estimation of the position of the lead end 46A of cement slurry 46. Accordingly, as will be described in more detail below, embodiments described herein provide alternative techniques for identifying the position of lead end 46A that offer the potential to be more convenient, less time consuming, and more accurate than conventional techniques.

In the embodiment of FIGS. 1-4, data processing system 18 is configured to determine (e.g., calculate) a position of the collection of fluids 40 in wellbore 20 (including a position of lead end 46A of cement slurry 46) relative to the surface 2 based on the volume of the collection of fluids 40 pumped into borehole 20 (via flow rate sensor 16), the pressure of the collection of fluids 40 as fluids 40 are pumped into borehole 20 (via pressure sensor 18), and the initial estimate of the average diameter 24D of the portion of borehole 20 under consideration (e.g., the average diameter 24D of downhole zone 28). The position determination by data processing system 18 may increase the accuracy of the estimated position of the collection of fluids 40 by obtaining a corrected estimate of the average diameter 24D of the portion of borehole 20 under consideration through an iterative process.

Figure 5:
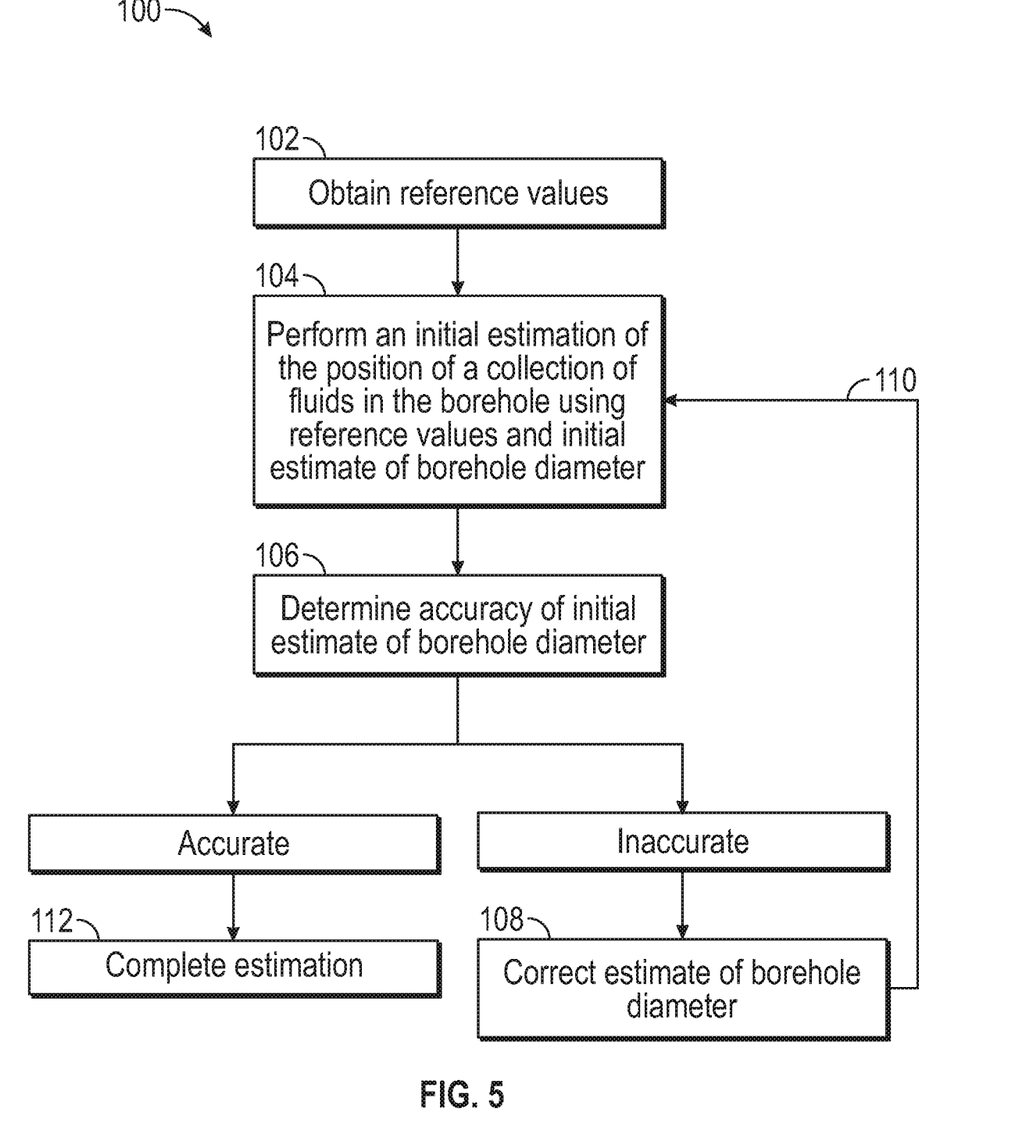
FIG. 5 is a flowchart illustrating of an embodiment of a method in accordance with principles disclosed herein for estimating the position of the cement deployed using the cementing system of FIGS. 1-4.

Referring now to FIG. 5, an embodiment of a method 100 for estimating the position of the collection of fluids 40 (including the position of lead end 46A) with data processing system 18 is shown. Method 100 generally includes obtaining references values (block 102), performing an initial estimation of the position of a collection of fluids in a borehole using the obtained reference values and an initial estimate of the diameter of at least a portion of borehole (block 104), determining the accuracy of the initial estimate of the borehole diameter (block 106), and correcting the estimate of the borehole diameter (block 108). In this embodiment, the steps of method 100 (e.g., blocks 102-108) are generally performed by data processing system 18; however, in other embodiments, the steps of method 100 may be performed by other components of cementing system 10.

Obtaining the reference values (block 102) includes obtaining the pressure of the collection of fluids 40 as it is pumped into an inlet of borehole 20 (e.g., an inlet of passage 32 of casing 30) from pressure sensor 16, the flow rate of the collection of fluids 40 into borehole 20 from flow sensor 17, and an initial estimate of the average diameter 24D of downhole zone 28. In some embodiments, the initial estimate of the average diameter 24D of downhole zone 28 is based on the manner in which downhole zone 28 was drilled, such as the diameter of the drill bit and/or other cutting tools used to form downhole zone 28 of borehole 20.

In this embodiment, performing the initial estimation (block 104) includes determining the position of the collection of fluids 40 in borehole 20 (including the position of lead end 46A of cement slurry 46) in terms of measured depth (MD) from the surface 2 based on the volume of the collection of fluids 40 pumped into borehole 20 and the geometry of casing 30 and borehole 20. The volume of the collection of fluids 40 pumped into borehole 20 may be determined from the flow rate measurements provided by flow sensor 17. The pertinent geometry of casing 30 includes the axial length, inner diameter (e.g., the diameter of passage 32), and outer diameter of casing 30. The pertinent geometry of borehole 20 includes the estimated average diameter 24D of downhole zone 28; however, in other embodiments, the pertinent geometry of borehole 20 may include the average diameter 24D of borehole 20 across varying portions and/or the entire axial length of borehole 20. Based on the estimated average diameter 24D of downhole zone 28 and the outer diameter of casing 30, the average thickness or width of annulus 26 extending through downhole zone 28 may be estimated, where a thinner annulus 26 may position fluids in annulus 26 relatively closer to the surface 2 than a thicker annulus 26 for a given volume of fluid disposed in borehole 20.

Referring still to FIG. 5, data processing system 18 determines the accuracy of the initial estimate of the borehole diameter (block 106) in method 100 by comparing the pressure of the collection of fluids 40 (as measured by pressure sensor 16) as the fluids 40 are pumped into borehole 20 at a first time or point in time and a second time or point in time during the cementing operation performed by cementing system 10. In this embodiment, the first point in time is during the first stage 11 of the cementing operation 10 when drilling fluid 42 is pumped into and circulated from borehole 20, and the second point in time is during the fourth stage 17 of the cementing operation just prior (e.g., within ten seconds) to shut-off plug 58 contacting wiper plug 50; however, in other embodiments, the first and second points in time may correspond to other points in time during the cementing operation performed by cementing system 10.

The pressure of the collection of fluids 40 as fluids 40 flow into the inlet of the passage 31 of casing 30 corresponds to the sum of the frictional pressure losses of the fluids 40 flowing through passage 32, the hydrostatic pressure of the fluids 40 disposed in annulus 26, and the frictional pressure losses of the fluids 40 flowing through annulus 26, minus the hydrostatic pressure of the collection of fluids 40 disposed in passage 32 of casing 30 minutes, as represented below by equation (1):

$$P_{fluids} = (\Sigma_{i=1}^{i=fluids} P_{hydraulic,i}^{annulus} - \Sigma_{j=1}^{j=fluids} P_{hydraulic,j}^{casing}) + (\Sigma_{i=1}^{i=fluids} P_{friction,i}^{annulus} + \Sigma_{j=1}^{j=fluids} P_{friction,j}^{casing}) \quad (1)$$

Equation (1) refers to the general case where a plurality of fluids having different fluid properties may be disposed in annulus 26 of borehole 20 ("i fluids" in equation (1)), and a plurality of fluids having different fluid properties may be disposed in passage 32 of casing 30 ("j fluids" in equation (1)). In this embodiment, at the first point in time the collection of fluids 40 only comprises drilling fluid 42, and thus, the pressure of the collection fluids 40 being pumped into borehole 20 at the first time may be represented by equation (2) below:

$$P_{1st\ time} = (P_{hydraulic,mud}^{annulus} - P_{hydraulic,mud}^{casing}) + (P_{friction,mud}^{annulus} - P_{friction,mud}^{casing}) \quad (2)$$

In some embodiments, equation (2) comprises a first pressure balance at the first point in time between the pressure of the collection of fluids 40 at the inlet of casing 30 and the pressure of the collection of fluids 40 as they exit annulus 26 at the surface 2. The pressure of the collection of fluids 40 exiting annulus 26 at surface 2 may be atmospheric pressure or a pressure greater than atmospheric. Additionally, given that in this embodiment drilling fluid 42, spacer fluid 44, and cement slurry 46 are each disposed both in passage 32 of casing 30 and annulus 26 during the second time, the pressure of the collection fluids 40 being pumped into borehole 20 at the second time in this embodiment may be represented by equation (3) below, where both "i fluids" and "j fluids" include drilling mud 42, spacer fluid 44, and cement slurry 46:

$$P_{2nd\ time} = (\Sigma_{i=1}^{i=3} P_{hydraulic,i}^{annulus} - \Sigma_{j=1}^{j=3} P_{hydraulic,j}^{casing}) + (\Sigma_{i=1}^{i=3} P_{friction,i}^{annulus} + \Sigma_{j=1}^{j=3} P_{friction,j}^{casing}) \quad (3)$$

Although in this embodiment "i fluids" and "j fluids" of equation (3) include drilling mud 42, spacer fluid 44, and cement slurry 46, in other embodiments, the "i fluids" and "j fluids" of equation (3) may comprise varying numbers and types or species of fluids, including a single fluid species or more than three separate fluid species. In some embodiments, equation (3) comprises a second pressure balance at the second point in time between the pressure of the collection of fluids 40 at the inlet of casing 30 and the pressure of the collection of fluids 40 as they exit annulus 26 at the surface 2. The pressure of the collection of fluids 40 exiting annulus 26 at surface 2 may be atmospheric pressure or a pressure greater than atmospheric.

Further, the pressure of the collection fluids 40 being pumped into borehole 20 at the first time may be subtracted from the pressure of the collection fluids 40 being pumped into borehole 20 at the second time, represented, in this embodiment, by equation (4) below:

$$P_{2nd\ time} - P_{1st\ time} = \\ \left( \sum_{i=1}^{i=3} P_{hydraulic,i}^{annulus} - \sum_{j=1}^{j=3} P_{hydraulic,j}^{casing} + P_{hydraulic,mud}^{casing} - P_{hydraulic,mud}^{annulus} \right) + \\ \left( \sum_{i=1}^{i=3} P_{friction,i}^{annulus} + \sum_{j=1}^{j=3} P_{friction,j}^{casing} - P_{friction,mud}^{annulus} - P_{friction,mud}^{casing} \right) \quad (4)$$

Although in this embodiment "i fluids" and "j fluids" of equation (4) include drilling mud 42, spacer fluid 44, and cement slurry 46, in other embodiments, the "i fluids" and "j fluids" of equation (4) may comprise varying numbers and species of fluids, including a single fluid species or more than three separate fluid species. In this embodiment, the pressure of the collection of fluids 40 exiting the annulus 26 at the surface 2 is the same at both the first and second points in time. Thus, even when the pressure of the collection of fluids 40 exiting annulus 26 is greater than atmospheric, the pressure of the collection of fluids 40 exiting annulus 26 at the first and second points in time cancel each other out in equation (4). In this embodiment, data processing system 18 via method 100 determines the accuracy of the initial estimate of the borehole diameter (block 106) by comparing ($P_{2nd\ time} - P_{1st\ time}$) as measured by pressure sensor 16 of cementing head 14 at the first and second points in time (e.g., left-hand side of equation (4)) with the ($P_{2nd\ time} - P_{1st\ time}$) as estimated from the flow rate and volume of the collection of fluids 40 disposed in borehole 20 at the first and second times (provided by flow sensor 17) and the and the geometry of casing 30 and borehole 20, including the initial estimate of the average diameter 24D of downhole zone 28 (e.g., right-hand side of equation (4)). In some embodiments, the measured ($P_{2nd\ time} - P_{1st\ time}$) comprises a measured pressure differential while the estimated ($P_{2nd\ time} - P_{1st\ time}$) comprises a cementing simulation where method 100 corrects the cementing simulation by correcting the initial estimated average diameter 24D.

Particularly, the hydraulic pressure terms included in the estimated ($P_{2nd\ time} - P_{1st\ time}$) side of equation (4) may be determined by calculating the hydrostatic effect for each fluid (e.g., drilling fluid 42, spacer fluid 44, and/or cement slurry 46) of the collection of fluids 40 disposed in passage 32 of casing 30 and annulus 26 at the first and second points in time, represented below by equations (5) (hydraulic effect of fluid disposed in casing 30) and (6) (hydraulic effect of fluid disposed in annulus 26) below, where p refers to the density of each fluid disposed in casing 30 ($\rho_j$) and annulus 26 ($\rho_i$), and h refers to the column height in true vertical depth (TVD) of each fluid disposed in casing 30 ($h_j$) and annulus 26 ($h_i$):

$$P_{hydraulic,j}^{casing} = \rho_j g h_j \quad (5)$$

$$P_{hydraulic,i}^{annulus} = \rho_i g h_i \quad (6)$$

Given that portions of borehole 20 may be deviated relative to the surface, the column height h of each fluid may be less than the axial length the fluid in either passage 32 of casing 30 or annulus 26. The column height h of each fluid of the collection of fluids 40 may be estimated from the volume of each fluid pumped into borehole 20 (calculated from the flow measurements provided by flow sensor 17) and the geometry of casing 30 and borehole 20.

The frictional pressure loss terms included in the estimated ($P_{2nd\ time} - P_{1st\ time}$), right-side of equation (4) may be estimated from the properties of each fluid of the collection of fluids 40, the length of each fluid of the collection of fluids 40, and the calculated tubular velocity in passage 32 of casing 30 and the annular velocity of the collection of fluids flowing through annulus 26. The tubular velocity ($V_{tubular}$) and annular velocity ($V_{annular}$) may be calculated from the measured flow rate ($Q_{fluids}$) of the collection of fluids 40 provided by flow sensor 17 and the geometry of casing 30 and borehole 20, as represented by equations (7) and (8), respectively, where $Q_{fluids}$ is measured by flow sensor 17 of cementing head 14, $D_{in}$ refers to the average diameter of passage 32, $D_{out}$ refers to the average diameter of the outer surface of casing 30, and $D_{sidewall}$ refers to the average diameter 24D of downhole zone 28:

$$v_{tubular} = \frac{Q_{fluids}}{\frac{\pi D_{in}^2}{4}} \quad (7)$$

$$v_{annulus} = \frac{Q_{fluids}}{\frac{\pi(D_{sidewall}^2 - D_{out}^2)}{4}} \quad (8)$$

Once the tubular and annular velocities have been estimated for each fluid of the collection of fluids 40 flowing in the casing 30 and annulus 26 at the first and second points in time, the frictional pressure losses in casing 30 and annulus 26 may be calculated for each fluid. Particularly, the frictional pressure losses of the collection of fluids 40 in annulus 26 at the first and second points in time may be estimated from the estimated annular velocity, the rheology, and length of each fluid in annulus 26. In some embodiments, the frictional pressure losses from fluids flowing through annulus 26 is obtained by utilizing the Herschel-Bulkley non-Newtonian fluid model. Particularly, using the Herschel-Bulkley model, the stream function ψ may be solved iteratively from equations (9) and (10) presented below for each fluid i (e.g., drilling mud 42, spacer fluid 44, and/or cement slurry 46), where (dimensionless) is the cooperativity length scale and n (dimensionless), $T_y$ (in units of Pascals (Pa)), and k (in units of Pa·s$^n$) are rheological factors:

$$\xi_i = \frac{12 v_{annulus}}{D_{out} - D_{sidewall}} \left( \frac{k_i}{\tau_{y,i}} \right)^{\frac{1}{n_i}} \quad (9)$$

$$\xi_i = \frac{3n_i(1-\Psi_i)^{1+\frac{1}{n_i}}(1+n_i+n_i\Psi_i)}{(n_i+1)(2n_i+1)\Psi_i^{\frac{1}{n_i}}} \quad (10)$$

Once $\psi$ is obtained for each fluid i, equation (11) presented below may be used to obtain the frictional pressure losses from fluids flowing through annulus 26, where L is the length (e.g., along axis 15) of each fluid i in annulus 26:

$$P_{friction,i}^{annulus} = \left(\frac{4\tau_{y,i}}{\psi_i(D_{sidewall} - D_{out})}\right)L_i \quad (11)$$

Additionally, the frictional pressure losses of the collection of fluids 40 passage 32 of casing 30 at the first and second points in time may be estimated from the estimated tubular velocity, the rheology, and length of each fluid in casing 30. Particularly, using the Herschel-Bulkley model, the stream function $\psi$ may be solved iteratively from equations (12) and (13) presented below for each fluid j (e.g., drilling mud 42, spacer fluid 44, and/or cement slurry 46):

$$\xi_j = \frac{8v_{tubular}}{D_{in}}\left(\frac{k_j}{\tau_{y,j}}\right)^{\frac{1}{n_j}} \quad (12)$$

$$\xi_i = \frac{4n_j(1-\Psi_j)^{1+\frac{1}{n_j}}}{\Psi_j^{\frac{1}{n_j}}}\left[\frac{(1-\Psi_j)^2}{3n_j+1} + \frac{\Psi_j(1-\Psi_j)}{2n_j+1} + \frac{\Psi_j^2}{n_j+1}\right] \quad (13)$$

Once $\psi$ is obtained for each fluid j, equation (14) presented below may be used to obtain the frictional pressure losses from fluids flowing through casing 30, L is the length (e.g., along axis 15) of each fluid j in casing 30:

$$P_{friction,j}^{casing} = \left(\frac{4\tau_{y,j}}{\psi_j D_{in}}\right)L_j \quad (14)$$

In other embodiments, the frictional pressure losses from fluids flowing through annulus 26 may obtained by utilizing the Bingham plastic non-Newtonian fluid model. Particularly, using the Bingham plastic model, $\xi$ is obtained from equation (15) presented below for each fluid i (e.g., drilling mud 42, spacer fluid 44, and/or cement slurry 46), where $\mu_y$ is a rheological factor in units of (Pa·s). Additionally, once $\xi$ is obtained for each fluid j, equation (16) presented below may be used to obtain the stream function $\psi$ for each fluid i. Further, once $\psi$ is obtained for each fluid i, equation (11) presented above may be used to obtain the frictional pressure losses from fluids flowing through annulus 26.

$$\xi_i = \frac{12v_{annulus}}{D_{out} - D_{sidewall}}\left(\frac{\mu_{y,i}}{\tau_{y,i}}\right) \quad (15)$$

$$\Psi_i = \left(2\sqrt{\frac{2\xi_i}{3}+1}\right)\sin\left\{\frac{1}{3}\sin^{-1}\left[\left(\frac{2\xi_i}{3}+1\right)^{-\frac{3}{2}}\right]\right\} \quad (16)$$

Additionally, the frictional pressure losses of the collection of fluids 40 passage 32 of casing 30 at the first and second points in time may be estimated in this embodiment using the Bingham plastic model. Particularly, using the Bingham plastic model, the stream function $\psi$ may be obtained from equations (17) presented below. Additionally, once $\xi$ is obtained for each fluid j, equation (18) presented below may be used to obtain the stream function $\psi$ for each fluid j. Further, once $\psi$ is obtained for each fluid i, equation (14) presented above may be used to obtain the frictional pressure losses of the collection of fluids 40 passage 32 of casing 30.

$$\xi_j = \frac{8v_{tubular}}{D_{in}}\left(\frac{\mu_{y,i}}{\tau_{y,i}}\right) \quad (17)$$

$$\xi_i = \frac{1}{\Psi_j}\left(1 - \frac{4}{3}\Psi_j + \frac{1}{3}\Psi_j^4\right) \quad (18)$$

some embodiments, the collection of fluids 40 disposed in borehole 20 at the first and/or second points in time comprises Newtonian fluids. In embodiments including Newtonian fluids, the frictional pressure losses from Newtonian fluids flowing through annulus 26 may be obtained from equation (19) presented below, where $\mu_i$ is the fluid viscosity of each Newtonian fluid i flowing through annulus 26 and $\alpha$ is the ratio of diameters $D_{sidewall}/D_{out}$:

$$P_{friction,i}^{annulus} = \left(\frac{32\mu_i v_{annulus}}{D_{out}^2}\right)\left(\frac{1}{(1+\alpha^2) + \frac{(1-\alpha^2)}{\ln(\alpha)}}\right)L_i \quad (19)$$

Additionally, in embodiments including Newtonian fluids, the frictional pressure losses from Newtonian fluids flowing through casing 30 may be obtained from equation (20) presented below, where $\mu_i$ is the fluid viscosity of each Newtonian fluid j flowing through casing 30:

$$P_{friction,j}^{casing} = \left(\frac{32\mu_j v_{tubular}}{D_{in}^2}\right)L_j \quad (20)$$

In this embodiment, equations (5)-(20) may be used, in conjunction with the flow rate measurements provided by flow sensor 17, to calculate the estimated ($P_{2nd\ time} - P_{1st\ time}$) representing the right-hand side of equation (4). In this embodiment, having calculated the estimated ($P_{2nd\ time} - P_{1st\ time}$), data processing system 18 via method 100 compares the estimated ($P_{2nd\ time} - P_{1st\ time}$) with the measured ($P_{2nd\ time} - P_{1st\ time}$) representing the left-hand side of equation (4) to determine the accuracy of the initial estimate of the average diameter 24D of downhole zone 28 (block 106).

If the measured ($P_{2nd\ time} - P_{1st\ time}$) is not equal to the estimated ($P_{2nd\ time} - P_{1st\ time}$), then the initial estimate of the average diameter 24D of downhole zone 28 may not be equal to the actual average diameter 24D of downhole zone 28. Thus, in this embodiment, following the determination of the accuracy of the initial estimate of the borehole diameter (block 106), data processing system 18 via method 100 corrects the estimate of the borehole diameter (block 108) by altering the initial estimate by a predetermined amount or degree (e.g., a predetermined percentage based on the amount of difference between the estimated and measured ($P_{2nd\ time} - P_{1st\ time}$)).

Particularly, in this embodiment, if the measured ($P_{2nd\ time} - P_{1st\ time}$) is greater than the estimated ($P_{2nd\ time} - P_{1st\ time}$), then the initial estimate of the average diameter 24D of downhole zone 28 may be larger than the actual average diameter 24D of downhole zone 28. For instance, if the initial estimate of the average diameter 24D is larger than the actual average diameter 24D, then the estimated position of the lead end 46A of cement slurry 46 at the second point in time will be farther from the surface 2 than the actual position of lead end 46A, reducing the amount of estimated pressure applied by the cement slurry 46 disposed in annulus 26, and in-turn, reducing the estimated ($P_{2nd\ time}$–$P_{1st\ time}$). Thus, if the measured ($P_{2nd\ time}$–$P_{1st\ time}$) is greater than the estimated ($P_{2nd\ time}$–$P_{1st\ time}$), then position estimator reduces the initial estimate of the average diameter 24D of downhole zone 28 to produce a corrected estimate of the average diameter 24D of downhole zone 28 that is closer to the actual average diameter 24D of zone 28. Conversely, in this embodiment, if the measured ($P_{2nd\ time}$–$P_{1st\ time}$) is less than the estimated ($P_{2nd\ time}$–$P_{1st\ time}$), then the initial estimate of the average diameter 24D of downhole zone 28 may be less than the actual average diameter 24D of downhole zone 28. Therefore, if the measured ($P_{2nd\ time}$–$P_{1st\ time}$) is less than the estimated ($P_{2nd\ time}$–$P_{1st\ time}$), then position estimator increases the initial estimate of the average diameter 24D of downhole zone 28 to produce a corrected estimate of the average diameter 24D of downhole zone 28 that is closer to the actual average diameter 24D of zone 28.

In this embodiment, following the correction of the estimate of the borehole diameter (block 108), data processing system 18 determines the accuracy of the corrected estimate of the borehole diameter (indicated by arrow 110 in FIG. 5) in method 100 by calculating a corrected estimation of ($P_{2nd\ time}$–$P_{1st\ time}$) (e.g., the right-hand side of equation (4)) using the corrected estimate of the average diameter 24D of downhole zone 28. In this embodiment, if the corrected estimation of ($P_{2nd\ time}$–$P_{1st\ time}$) is still different from the measured ($P_{2nd\ time}$–$P_{1st\ time}$) (e.g., the left-hand side of equation (4)), data processing system 18 calculates a new or second corrected estimate of the average diameter 24D of downhole zone 28 by either increasing or decreasing the corrected estimate of average diameter 24D based on whether the corrected estimation of ($P_{2nd\ time}$–$P_{1st\ time}$) is greater or less than the measured ($P_{2nd\ time}$–$P_{1st\ time}$). Thus, in this embodiment, blocks 106 and 108 of method 100 are performed iteratively to refine the accuracy of the estimated average diameter 24D of downhole zone 28 until the estimated ($P_{2nd\ time}$–$P_{1st\ time}$) equals or is substantially equal to the measured ($P_{2nd\ time}$–$P_{1st\ time}$), indicating that the iteratively corrected estimation of the average diameter 24D of downhole zone 28 is equal or substantially equal to the actual average diameter 24D of downhole zone 28.

In this embodiment, irrespective of the number of iterations of blocks 106 and 108 performed in method 100 by data processing system 18, once an estimated ($P_{2nd\ time}$–$P_{1st\ time}$) that equals or substantially equals the measured ($P_{2nd\ time}$–$P_{1st\ time}$), position estimator 110 completes the estimation of the position of the collection of fluids 40 at the second point in time (block 112 in FIG. 5) by calculating the position of the collection of fluids 40 in borehole 20 using the final or corrected estimated diameter 24D of downhole zone 28 used to produce the final estimated ($P_{2nd\ time}$–$P_{1st\ time}$). In this embodiment, as described above, the position (in terms of MD) of each fluid of the collection of fluids 40 disposed in borehole 20 at the second point in time may be determined from the volume of the collection of fluids 40 pumped into borehole 20 (including lead end 46A of cement slurry 46) at the second point in time (provided by flow sensor 17) and the geometry of casing 30 and borehole 20, including the final or corrected estimated diameter 24D of downhole zone 28.

In the manner described above, data processing system 18 via method 100 provides a final or corrected estimation of the position the position of the collection of fluids 40 at the second point in time that is more accurate and reliable than an estimation of the position of the collection of fluids 40 that does not confirm or correct the initial estimation of the average diameter 24D of downhole zone 28. Additionally, in some embodiments, data processing system 18 provides corrected estimations of the position of the collection of fluids 40 in borehole 20 automatically and in real time. Thus, data processing system 18 provides a reliable and accurate estimation of the position of the collection of fluids 40 without needing to employ a sonic tool or other expensive and time-consuming confirmation process for reliably confirming the position of fluids in borehole 20. Given the reliability of the final estimation provided by data processing system 18, method 100 may obviate the need of employing a secondary confirmation process to determine the position of the collection of fluids 40 in borehole 20, reducing the costs of the completion operation.

The rapidity by which data processing system 18 performs method 100 provides the final estimation of the position of the collection of fluids 40 at the second point in time may reduce the overall duration of the completion of borehole 20. Additionally, the time savings provided by method 100 allows for remedial or corrective actions to be taken immediately following the completion of the cementing operation (e.g., in this embodiment, immediately following the second point in time). For instance, if position estimator determines that the lead end 46A of cement slurry 46 is positioned below (farther from surface 2) than targeted position 29, casing 30 may be immediately perforated to allow for the injection of additional cement into annulus 26 to complete the annular seal formed between casing 30 and downhole zone 28. Alternatively, cement slurry 46 may be pumped into annulus 26 from the surface 2 to complete the annular seal formed between casing 30 and downhole zone 28. The ability to immediately take corrective action following the final estimation performed by data processing system 18 via method 100 may mitigate potential issues resulting from the faulty cementing operation and/or reduce the overall time required to remedy the cementing operation such that completion of borehole 20 may be resumed.

Although in this embodiment method 100 only produces a final estimation of the position of the collection of fluids 40 at the second point in time, in other embodiments, method 100 includes continuously providing final or corrected estimations of the position of the collection of fluids 40 at a plurality of points in time. For instance, in some embodiments, method 100 may include providing a final or corrected estimation of the position of the collection of fluids 40 at a second point in time during the second stage 13 (shown in FIG. 2) of the cementing operation. Following the determination of the final estimation of the position of the collection of fluids 40 at the second point in time, data processing system 18 via method 100 may provide a final or corrected estimation of the position of the collection of fluids 40 at a third point in time during the third stage 15 (shown in FIG. 3) of the cementing operation. In some embodiments, data processing system 18 via method 100 provides the final or corrected estimation of the position of the collection of fluids 40 at the third point in time by comparing the measurements provided by sensors 16, 17 at the third point in time with the recorded measurements corresponding to either the second or first points in time.

In some embodiments, data processing system 18 may automatically provide a corrected estimation of the position of the collection of fluids 40 at a predetermined frequency. For instance, in some embodiments, method 100 may include providing a corrected estimation of the position of the collection of fluids 40 at a second point in time once a predetermined time period (e.g., five minutes) has lapsed since the first point in time. In some embodiments, method 100 may include providing a corrected estimation of the position of the collection of fluids 40 at a third point once the predetermined time period has lapsed since the second point in time. Thus, data processing system 18 may continue automatically providing corrected estimations of the position of the collection of fluids 40 at a frequency having a period corresponding to the predetermined time period until the cementing operation is completed. Further, by automatically providing corrected estimations of the position of the collection of fluids 40, data processing system 18 may automatically corrected estimates for discrete portions of the diameter 24D of sidewall 24.

Particularly, in certain embodiments, each time data processing system 18 provides a new corrected estimate of the position of the collection of fluids 40, the data processing system 18 may provide a corrected estimate of the average diameter 24D of the sidewall 24 corresponding to the portion of the annulus 26 through which the measured fluid of the collection of fluids (e.g., lead end 46A of the volume of cement slurry 46) passes through during the corresponding predetermined period of time. Thus, instead of providing a single corrected estimate of the average diameter 24D of the entire portion of sidewall 24 extending between the targeted position 29 and terminal end 22, data processing system 18 may provide a plurality of corrected estimates of the average diameter 24D of a corresponding plurality of discrete portions of the sidewall 24 disposed between targeted position 29 and terminal end 22. Further, although in this embodiment method 100 is used in conjunction with cementing system 10, in other embodiments, method 100 may be used in connection with other systems.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied.

Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for cementing a terranean borehole, comprising:

pumping a collection of fluids into the borehole through a passage of a tubular string extending into the borehole;

flowing the collection of fluids up an annulus between the tubular string and a sidewall of the borehole;

comparing a pressure of the collection of fluids measured at an inlet of the passage of the tubular string at a first time with a pressure of the collection of fluids measured at the inlet of the passage of the tubular string at a second time, wherein the second time is after the first time; and estimating a position of the collection of fluids in the borehole based on the comparison of the pressures of the collection of fluids measured at the first and second times.

2. The method of claim 1, further comprising pumping a cement slurry through perforations formed in casing or into the annulus from a surface of the borehole in response to the estimated position of the collection of fluids.

3. The method of claim 1, wherein:

the collection of fluids comprises a drilling mud and a cement slurry;

the first time occurs prior to the pumping of cement slurry into the borehole; and the second time occurs within ten seconds of a first plug disposed in the passage of the tubular string contacting a second plug disposed in the passage of the tubular string.

4. The method of claim 1, further comprising:

calculating a first pressure balance between the inlet of the passage of the tubular string and an outlet of the annulus at the first time;

calculating a second pressure balance between the inlet of the passage of the tubular string and an outlet of the annulus at the second time;

estimating a hydrostatic pressure of a column of the collection of fluids disposed in the annulus at the first time;

estimating a hydrostatic pressure of a column of the collection of fluids disposed in the annulus at the second time;

estimating a hydrostatic pressure of a column of the collection of fluids disposed in the passage of the tubular string at the first time;

estimating a hydrostatic pressure of a column of the collection of fluids disposed in the passage of the tubular string at the second time;

estimating a frictional pressure drop of the collection of fluids flowing through the annulus at the first time;

estimating a frictional pressure drop of the collection of fluids flowing through the annulus at the second time;

estimating a frictional pressure drop of the collection of fluids flowing through the passage of the tubular string at the first time; and estimating a frictional pressure drop of the collection of fluids flowing through the passage of the tubular string at the second time.

5. The method of claim 4, further comprising:

determining a first pressure differential by subtracting the first pressure balance from the second pressure balance;

determining a second pressure differential by subtracting the estimated hydrostatic pressures of the collection of fluids in the annulus at the second time, the hydrostatic pressure of the collection of fluids in the annulus at the first time, the hydrostatic pressures of the collection of fluids in the passage of the tubular string at the second time, the frictional pressure drop of the collection of fluids in the annulus at the first time, and the frictional pressure drop of the collection of fluids in the passage of the tubular string at the first time from a sum comprising the hydrostatic pressures of the collection of fluids in the annulus at the second time, the hydrostatic pressure of the collection of fluids in the passage of the tubular string at the first time, the frictional pressure drop of the collection of fluids in the annulus at the second time, and the frictional pressure drop of the collection of fluids in the passage of the tubular string at the second time; and comparing the first pressure differential with the second pressure differential.

6. A method for cementing a terranean borehole, comprising:

pumping a collection of fluids into the borehole through a passage of a tubular string extending into the borehole;

flowing the collection of fluids up an annulus positioned between the tubular string and a sidewall of the borehole;

comparing a pressure of the collection of fluids measured at an inlet of the passage of the tubular string at a first time with a second pressure of the collection of fluids measured at the inlet of the passage of the tubular string at a second time, wherein the second time follows the first time; and correcting a cementing simulation based on the comparison between the first and second pressures.

7. The method of claim 6, wherein the collection of fluids comprises drilling mud and a cement slurry.

8. The method of claim 6, wherein:

the cementing simulation comprises an estimation of a position of the collection of fluids in the borehole based on an initial estimated average diameter of the sidewall of at least a portion of the borehole, and a measured volume of the collection of fluids pumped into the borehole;

the method further comprises determining a corrected average diameter based on the comparison between the pressure of the collection of fluids measured at the first time and the pressure of the collection of fluids measured at the second time; and the method further comprises correcting the cementing simulation by substituting the initial estimated average diameter with the corrected average.

9. The method of claim 6, further comprising:

estimating a hydrostatic pressure of a column of the collection of fluids disposed in the annulus at the first time;

estimating a hydrostatic pressure of a column of the collection of fluids disposed in the annulus at the second time;

estimating a hydrostatic pressure of a column of the collection of fluids disposed in the passage of the tubular string at the first time;

estimating a hydrostatic pressure of a column of the collection of fluids disposed in the passage of the tubular string at the second time;

estimating a frictional pressure drop of the collection of fluids flowing through the annulus at the first time;

estimating a frictional pressure drop of the collection of fluids flowing through the annulus at the second time;

estimating a frictional pressure drop of the collection of fluids flowing through the passage of the tubular string at the first time;

estimating a frictional pressure drop of the collection of fluids flowing through the passage of the tubular string at the second time.

10. The method of claim 6, further comprising pumping a cement slurry through perforations formed in casing or into the annulus from a surface of the borehole in response to the corrected cementing simulation.

\* \* \* \* \*